United States Patent [19]

Kawai

[11] Patent Number: 4,609,260
[45] Date of Patent: Sep. 2, 1986

[54] AUTOMATIC FOCUSING APPARATUS FOR ZOOM LENS

[75] Inventor: Tohru Kawai, Kanagawa, Japan

[73] Assignee: Canon Kabushiki Kaisha, Tokyo, Japan

[21] Appl. No.: 611,414

[22] Filed: May 17, 1984

[30] Foreign Application Priority Data

May 20, 1983 [JP] Japan ............................ 58-89784

[51] Int. Cl.4 .................... G02B 7/10; G02B 15/18
[52] U.S. Cl. ........................... 350/430; 350/255
[58] Field of Search ............... 350/430, 429, 255

[56] References Cited

U.S. PATENT DOCUMENTS

| | | | |
|---|---|---|---|
| 3,972,056 | 7/1976 | Tsujimoto et al. | 354/25 |
| 4,043,642 | 8/1977 | Hirose et al. | 350/429 |
| 4,145,732 | 3/1979 | Pandres, Jr. | 350/430 |
| 4,161,756 | 6/1979 | Thomas | 350/429 |
| 4,439,018 | 3/1984 | Okajima et al. | 350/430 |
| 4,457,591 | 7/1984 | Muryoi et al. | 350/430 |

FOREIGN PATENT DOCUMENTS 56-047533 11/1981 Japan .
56-162728 12/1981 Japan .
56-162727 12/1981 Japan .

*Primary Examiner*—John K. Corbin
*Assistant Examiner*—Loha Ben
*Attorney, Agent, or Firm*—Toren, McGeady, Stanger, Goldberg & Kiel

[57] ABSTRACT

The disclosed zoom lens apparatus operates in a manual focusing mode and an automatic focusing mode with a manual focusing movement imparted to one lens component and an automatic focusing movement imparted to another lens component. In the automatic focusing mode, the manual focusing lens component is held stationary at a prescribed constant position and the automatic focusing lens component operates within limits which vary with zooming. In the manual focusing mode, the automatic focusing lens component rests at one of the limits of the zooming and focusing ranges.

5 Claims, 3 Drawing Figures

AUTOMATIC FOCUSING APPARATUS FOR ZOOM LENS

BACKGROUND OF THE INVENTION

1. Field of the Invention

This invention relates to an automatic focusing apparatus for a zoom lens.

2. Description of the Prior Art

In conventional zoom lenses the front component generally serves as the focusing component. For example, in the four-component zoom lens illustrated in FIG. 2, variator lens 2, i.e. the second counting from the front, moves along a linear track 6 to vary the focal length of the entire system and effect zooming. Compensator lens 3 moves along in a curved track 7 to compensate for the image shift resulting from variation of the focal length. An independent movement is imparted to the front or first component 1 for focusing purposes. The fourth or relay component 4 forms the image of an object at a constant plane 5. When focusing such a zoom lens, one need only take into account change of object distance in adjusting the axial position of front lens component 1, regardless of the focal length of the entire system. This has the advantage of making the structure of the operating mechanism for the focusing component very simple.

However, the front component 1 is, as a rule, far bulkier and heavier than the other components 2 to 4. Accuracy of control is thus difficult to achieve when automatic focusing is done with focus component 1. For example, because the moment of inertia is large, the usual drive systems operate inefficiently. Also, because the load is large, the speed is very slow.

In another known focusing method for zoom lenses, one of a number of lens components is moved to effect focusing. Position adjustment of that component must be controlled in accordance with not only the object distance but also the focal length of the entire system.

In such a zoom lens, focusing to the in-focus condition is followed by zooming. A necessary re-adjustment in position of the focusing component may be automatically made for achieving the resulting change of position for a correct sharp image. Such a technique is disclosed in Japanese Laid-Open patent application No. Sho 56-162728, a practical example of which is illustrated in FIG. 1. Here the zoom lens is constructed of a front or first component 101 which remains stationary during focusing and zooming, a second component 102 axially movable for variation of the focal length of the entire system, a third component 103 axially movable for image shift compensation and a fourth component 104 for focusing. Focusing component 101 is not moved by the zoom actuator. The zoom components 102 and 103 are moved in differential relation by respective control cams 106 and 107. The focal plane is indicated at 105. The actual axial position of the variator 102 is converted to a voltage signal by a focal length detector 109 in the form of a potentiometer with slider 108 riding on the holder frame for the variator 102. Because the axial position of the variator 102 varies as a linear function of the focal length, one value of voltage at the slider 108 unequivocally corresponds to one value of the focal length of the entire system. A drive circuit 111 for an electric motor 112 produces output pulses whose frequency varies depending upon the magnitude of voltage at the output of the focal length detector 109, so that the speed of movement of the focusing component 104 varies as the focal length varies. An in-focus detector 110 controls the direction of rotation of motor 112 depending upon the far and near focusing states and stops energization of motor 112 when the in-focus condition is detected. The speed of movement of the focusing lens is varied not as a continuous function of the focal length but discretely. For example, two pulse generators of different frequency can be used in combination with a changeover element. The changeover element responds to the output voltage of the focal length detector 109 crossing a certain critical level and renders one or the other of the pulse generators operative. The number of pulse generators may be increased.

When the image shift resulting from the change in the focal length is compensated for by moving either the lens system as a whole, the compensator alone, or a master lens, this image shift compensation may be carried out in an automatic focusing system such as is known in U.S. Pat. No. 3,972,056.

SUMMARY OF THE INVENTION

A first object of the present invention is to provide a zoom lens capable of changing over between automatic focusing and manual focusing with an apparatus for automatically adjusting the axial position of one component positioned behind the variator of the zoom lens which is different from that component that is manually movable for focusing in accordance with the output of an image sharpness sensor at the focal plane as well as the focal length of the entire system.

A second object of the present invention is to provide an apparatus for easily setting up the automatic focusing component in a close-up shooting position.

A third object of the present invention is to provide an automatic focusing apparatus for a zoom lens having an automatic focusing facility in an image shift compensating component behind a focal length varying component, so the automatic focusing mode occurs only when the manual focusing component, in the instance of FIG. 2, the front component 1, is set at a prescribed position. If the front member is out of this prescribed position, one of the limits for movement of the automatic focusing component no longer coincides with the focusing position for an infinitely distant object at infinity or thereabouts. Conversely, when switched to the manual focusing mode, the automatic focusing component, in the instance of FIG. 2, compensator 3, must be moved during zooming along the track 7 or in predetermined varying relation to variator 2. Otherwise, a discrepancy arises between the actual object distance and a distance the scale on the focusing ring indicates. Therefore, the prior known apparatus has the problem that the switching from automatic to the manual focusing is necessarily followed by manual resetting of the automatic focusing component to a certain position depending upon the actual focal length. Switching from the manual to the automatic focusing mode requires a subsequent manual resetting of the manual focusing component in the predetermined position. This is very troublesome to the user.

It is, therefore, another object of the present invention to eliminate this problem and provide a zoom lens apparatus which makes it possible for a single manual switching operation to suffice for setting the lens system in either the automatic or manual focusing modes.

DETAILED DESCRIPTION OF THE PREFERRED EMBODIMENT

Figure 1:
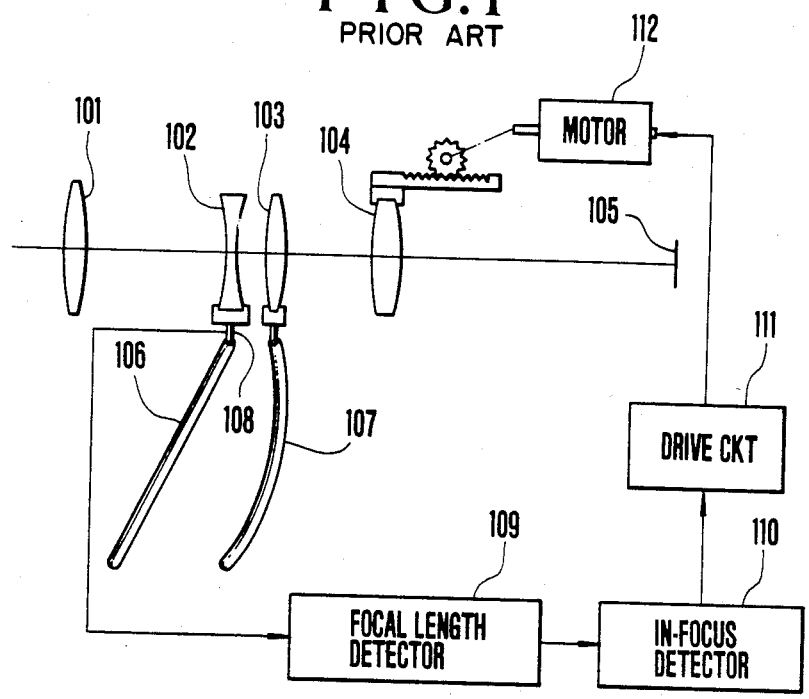
FIG. 1 is a schematic diagram, partly in block form, of a prior known apparatus.
Figure 2:
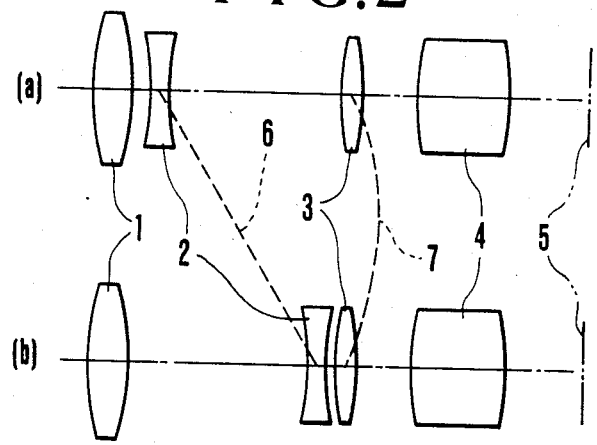
FIG. 2 is a block diagram of a conventional zoom lens optical system.
Figure 3:
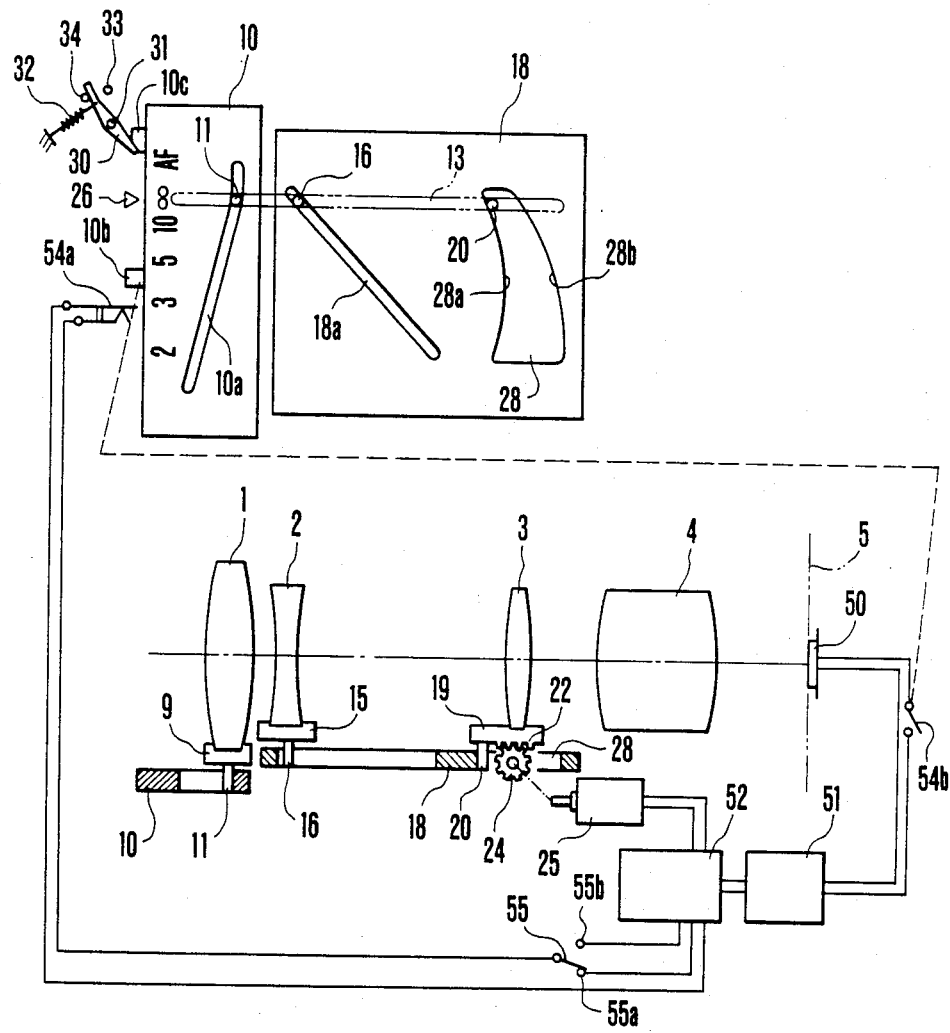
FIG. 3 is a schematic partly expanded and partly sectional view of an embodiment of the present invention.

The zoom lens used in the FIG. 3 embodiment of the invention is a conventional 4-component zoom lens, components 1 to 4 having similar functions to those of components 1 to 4 shown in FIG. 2. No more detailed explanation is given here.

The front component 1 is fixedly mounted in a first movable holder 9. Guide pin 11 extends from holder 9 radially through longitudinally elongated slot 13, through the wall of a body tube (not shown) and into camming groove 10a formed in an inner surface of distance adjusting ring 10. When ring 10 turns about an optical axis, the front component is moved axially to effect focusing.

Ring 10 also serves as an actuator for changing over between automatic and manual focusing modes. For this purpose, a distance scale cooperative with an index 26 is provided thereon. Two extensions 10b and 10c are fixedly carried by ring 10. By turning ring 10, manual focusing is effected from a minimum object distance to infinity. When it is turned beyond a symbol ∞ for infinity, thus placing index mark 26 and symbol AF in registry, the zoom lens apparatus is switched to the automatic focusing mode. Two switches 54a and 54b are arranged adjacent the first extension 10b. When in the manual focusing mode, switch 54a is closed and switch 54b is open. When in the automatic mode, the former is opened and the latter is closed. The second extension 10c cooperates with a lock lever 30 therefor. A spring 32 urges the lock lever 30 to turn about pivot pin 31 in a counterclockwise direction. The range of movement of lever 30 is defined by stopper pins 33 and 34.

Variator 2 is fixedly mounted to a second movable holder 15. Guide pin 16 extends radially from holder 15 through slot 13 into camming groove 18a zoom control cam sleeve 18.

Compensator 3 is fixedly mounted to a third movable holder 19 having a radial guide pin 20 and a rack 22 on the lower side. Guide pin 20 extends through slot 13 into a camming cutout 28. Front end 28a of camming contact 28 serves as a camming surface for moving compensator 3 during zooming with an object at infinity. Rear end 28b of camming cut-out 28 serves as another camming surface for moving compensator 3 during zooming with an object close-up. Front and rear ends 28a and 28b play the role of stoppers for defining variable limits of movement of compensator 3. A pinion 24 meshes with rack 22 and is drivingly connected to the output shaft of an electric motor 25.

The fourth component 4 is fixed to the body tube (not shown).

An image sharpness sensor 50, an in-focus detector 51, and a drive control circuit 52 control the operation of motor 25. A switch 55 for controlling the direction of rotation of the motor 25 has a first throw 55a for forward direction and a second throw 55b for the reverse direction.

In operation, to switch to the automatic focusing mode, the operator turns distance adjusting ring 10 to place the "AF" mark in registry with the index mark 26. As a result, second extension 10c is brought into opposite side of lever 30 while turning lever 30 in the clockwise direction. Thus, distance adjusting ring 10 is locked in its "AF" position under the action of the spring 32 urging the lever 30 to return. In this "AF" position, front component 1 is fixed in the same position as when the manual focusing mode operates with an object at infinity. This switching operation also causes switch 54b to close. As a result, the output signal from the image sharpness sensor 50 is applied to the in-focus detector 51. Drive control circuit 52 supplies a current to motor 25 in response to the output of detector 51. Since, at this time, switch 54a is open, adjustment in position of the compensator 3 is only controlled in accordance with the output signal of the image sharpness sensor 50. Limits of focusing movement of compensator 3 for the given focal length of the entire system are determined by the cams 28a and 28b respectively. When zoom sleeve 18 turns, variator 2 is moved axially while compensator 3 is simultaneously moved axially by the motor 25 to bring the image into focus at the focal plane 5. Under the in-focus condition, the compensator 3 takes an axial position depending upon the focal length and the object distance from the minimum to infinity.

To switch to the manual focusing mode, the operator, while turning lock lever 30 clockwise, turns distance adjusting ring 10 away from the "AF" position, thereby opening switch 54b to cut off the supply of the output signal from the image sharpness sensor 50, and closing switch 54a. For the normal focusing range, switch 55 is in its "a" position and motor 25 is supplied with electric current from the drive control circuit 52 to rotate in the forward direction. As motor 25 rotates in the forward direction, compensator 3 is moved until guide pin 20 is in abutting engagement with the front camming surface 28a. Manual focusing is carried out by turning ring 10. During focusing, compensator 3 is always pressed against camming surface 28a. During zooming, compensator 3 is always moved axially along the image compensation track or camming surface 28a.

When switch 55 is moved to the opposite or "b" position motor 25 is supplied with an electric current of reverse direction and compensator 3 is set in contact with the opposite camming surface 28b. With this, macro-photography becomes possible. As zoom sleeve 18 turns to effect zooming, compensator 3 is moved axially while guide pin 20 is kept in contact with rear camming surface 28b by the action of the bias force of the energized motor 25.

As has been described in greater detail above, the present invention provides a zoom lens apparatus in which switching to the automatic focusing mode is accompanied with automatic setting of the manual focusing or first component 1 in a prescribed position. This insures that, without having to shift the focusing range, accurate and reliable focusing can be performed from a minimum object distance to infinity. Even more advantageous is the quick focusing that results, because the focusing lens component or compensator 3 has a reasonable range of movement. When switching to the manual focusing mode, compensator 3 is automatically moved in a prescribed differential relation to the variator 2. The object distance which the scale on ring 10 registers always coincides with the actual distance, giving the advantage of improving the manageability of the zoom lens. These features in combination produce the additional advantage of broadening the capabilities of the zoom lens to include macro-photography. In this case, distance adjusting ring 10 is provided with an additional distance scale (not shown) adapted to be used for macro-photography.

What I claim:

1. An operation mechanism for a zoom lens comprising:
   (a) a focusing actuator member capable of changing between a manual focusing mode and an automatic focusing mode;
   (b) a first lens component for focusing in response to manual movement of said focusing actuator member;
   (c) a movable second lens component for varying the magnification power;
   (d) a third lens component arranged upon zooming to move to compensate for the image shift resulting from movement of said second lens component;
   (e) means for driving said third lens component;
   (f) drive control means for controlling the driving direction of said driving means;
   (g) detecting means receptive of the reflected light from an object to be photographed for measuring the degree of sharpness of an object image, and responsive to detection of a direction in which the object image can be brought to sharp focus for producing a control signal for said third lens component;
   (h) cam means for controlling the amount of movement of said third lens component, said cam means having a first cam surface corresponding to the infinite limit of a focusing range rendered operative when said focusing actuator member is moved to select the manual focusing mode;
   (i) control means receptive of the signal from said detecting means and responsive to selection of said mode of said focusing actuator member for controlling said drive means and for producing output signals to bring and take said third lens component into and out of contact with said cam surface depending upon said mode selected; and
   (j) changeover means for controlling said control means by changing the mode of said focusing actuator member.

2. A lens assembly according to claim 1, wherein:
   said cam means includes a second cam for moving said third lens component to a macro-photography position, and
   further comprising:
   second changeover means for causing said control means to produce an output signal for bringing said third lens component into follow-up contact with said second cam.

3. A lens assembly capable of switching between a manual focusing mode and an automatic focusing mode, comprising:
   (a) a focusing actuator member for selecting a manual focusing mode and an automatic focusing mode;
   (b) a manually focusable lens component axially movable by said focusing actuator member to effect manual focusing;
   (c) an automatically focusable lens component arranged upon selection of the automatic focusing mode by said focusing actuator member to move axially;
   (d) drive means for driving said automatically focusable lens component;
   (e) detecting means receptive of the reflected light from an object to be photographed for detecting the sharpness of an object image to produce a signal for controlling movement of said automatically focusable lens component toward a sharp focus;
   (f) cam means for controlling the amount of movement of said automatically focusable lens component, said cam means having a cam surface for determining the position of said automatically focusable lens component when said focusing actuator member has selected the manual focusing mode;
   (g) control means receptive of the signal from said detecting means and responsive to selection of said mode of said focusing actuator member for controlling said drive means and for producing output signals to bring and take said third lens component into and out of contact with said cam surface depending upon said mode selected; and
   (h) changeover means for controlling said control means by changing the mode of said focusing actuator member.

4. A lens assembly as in claim 3, wherein:
   said cam means includes a second cam for moving said automatically focusable lens component to a macro-photography position, and further comprising:
   second changeover means for causing said control means to produce an output signal for bringing said automatically focusable lens component into follow-up contact with said second cam.

5. A lens assembly as in claim 3, wherein said cam surface defines the position of said automatically focusable lens when the lens is focused on infinity.

* * * * *